Oct. 17, 1939.   W. L. PEARCE   2,176,358
DRILL
Filed Sept. 3, 1938

Inventor
WILLIAM L PEARCE
By
Edward V. Hardway
Attorney

Patented Oct. 17, 1939

2,176,358

UNITED STATES PATENT OFFICE 2,176,358

DRILL

William L. Pearce, Houston, Tex.

Application September 3, 1938, Serial No. 228,310

3 Claims. (Cl. 255—71)

This invention relates to a drill.

An object of the invention is to provide a drill specially adapted for use in deep well drilling and capable of disintegrating either hard or soft formations.

Another object of the invention is to provide a drill embodying a head with rotatable cutters mounted on the forward end of the head and of approximately conical shape in general contour, said cutters having a novel type of external cutting blades thereon.

In drills of the type embodying rotatable cutters it is common practice to mount the cutters to rotate on stationary spindles with antifriction bearings between the cutters and spindles. In such case the bearings and the spindle ends are enclosed within the cutters. These relatively movable parts enclosed within the cutters necessitate the removal of considerable material from the cores, or central portions, of the cutters thus restricting the depth to which the external cutting teeth of the cutters can be cut. One of the features of the present invention resides in the fact that the cutters are fixed on the inner ends of the spindles and the spindles are rotatably mounted in the head thus necessitating the removal of a minimum amount of material from the cutters and allowing the external cutting blades, or teeth, to be cut or formed to a greater depth. The type of cutter thus produced is specially adapted for penetrating shale or other soft, or semi-hard, formations although it is equally well adapted for cutting rock or other hard formations.

It is a further object of the invention to provide a drill provided with channels for flushing fluid so arranged that the flushing, or drilling, fluid will be discharged directly into the upper ends of the flutes between the blades of the rotatable cutters whereby the formation will be washed out from between said blades and not allowed to congest in said flutes thus materially increasing the efficiency of the drill.

A further feature of the invention resides in the provision of a novel type of cutter and spindle assembly mounted in the head in a novel manner as will be more specifically hereinafter pointed out.

With the above and other objects in view the invention has particular relation to certain novel features of construction, operation and arrangement of parts, an example of which is given in this specification and illustrated in the accompanying drawing, wherein.

Figure 1:
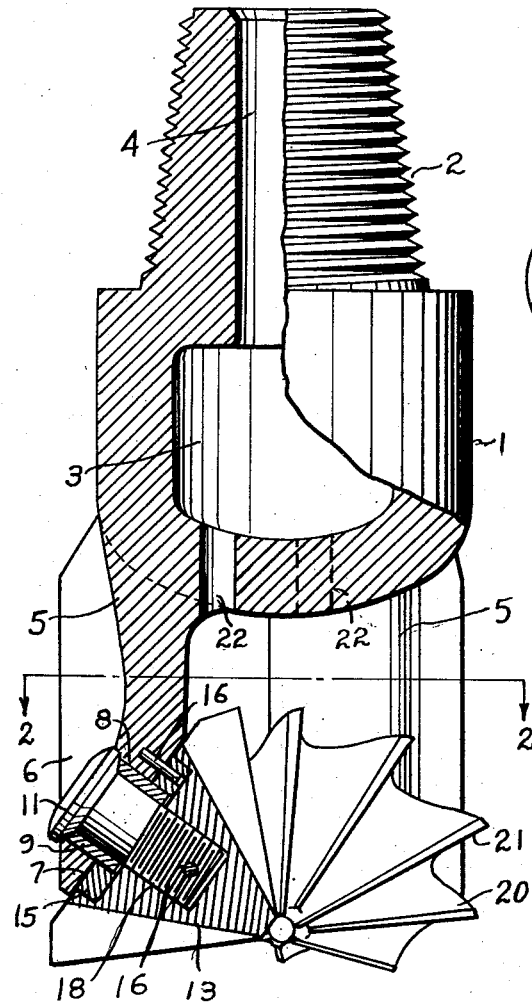
Figure 1 shows a side elevation of the drill, partly in section.
Figure 2:
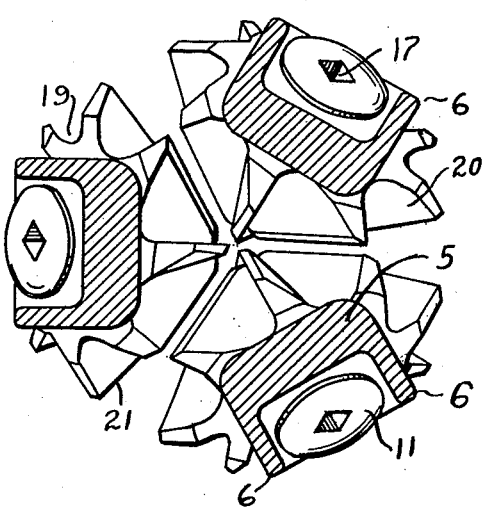
Figure 2 shows a cross-sectional view taken on the line 2—2 of Figure 1.

Referring now more particularly to the drawing wherein like numerals of reference designate the same parts in each of the figures, the numeral 1 designates a drill head preferably cylindrical in form, having its upper end formed with a threaded shank 2 for connection to the drill collar of the ordinary drill stem and having an internal chamber 3 with an axial channel 4 leading from the upper end thereof to said chamber for the conduct of the drilling fluid. The lower end of the head has a plurality of depending legs as 5. Any selected number of legs may be employed, three being shown. They have the external, marginal webs as 6 for strength. The lower ends of the legs have the inside, downwardly flared faces 7 as well as the downwardly and inwardly converging bearing recesses 8 to receive the bushings 9 whose outer ends are beveled, as shown in Figure 1.

The spindles 10 are fitted downwardly and inwardly through the corresponding bushings 9. The inner ends of the spindles are externally threaded and their outer ends are enlarged forming the heads 11 whose inner sides are flared to conform to the flare of the outer ends of the bushings 9. That portion of each spindle between the threads thereof, and the head is blank, as shown more clearly in Figure 1, said blank portion fitting within the corresponding bushing and the blank portion of each spindle as well as the head thereof are coated with any selected hard surfacing material 12 for durability.

Screwed on to the inner, or lower, end of each spindle there is the conical-shaped cutter 13. The large end of each cutter has an annular, countersunk groove 14 to receive an annular washer 15. A dowel pin 16 holds the corresponding washer against turning so as to prevent wear on the corresponding face 7. When a cutter is screwed home on its spindle it may be pinned in that position by the transverse pin 16 extending through the cutter and spindle and when in said home position the washer 15 will bear against the opposing face 7. The spindle will thus turn with the cutter during drilling operations. The parts 9 and 15 being the only parts subjected to any considerable wear may be readily removed and replaced as is obvious. There will be substantially no frictional wear on the spindle 16 by reason of the fact that the portion of said spindle subject to friction is hard surfaced.

The outer end of each spindle is provided with a socket 17 to receive any type of conventional socket wrench whereby the spindle may be screwed into the internally threaded, axial socket 18 in the corresponding cutter. The formation of the socket 18 in the cutter will remove a minimum amount of material so that the flutes 19 between the cutter blades 20 may be formed much deeper than would be the case if the cutters were mounted to rotate on the spindle in which latter case provision would have to be made for antifriction bearings with the body of the cutter.

Figure 3:
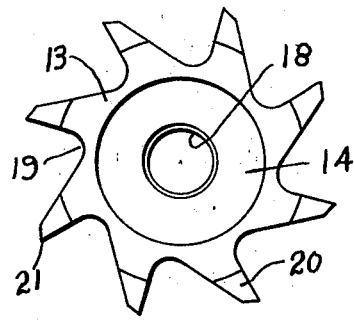
Figure 3 shows a top plan view of the rotatable cutter employed.
Figure 4:
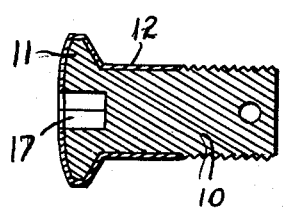
Figure 4 shows a longitudinal, sectional view of the cutter spindle.

The flutes 19 have their greatest depth at the base, or large end, of the cutter and they gradually taper to a shallower depth toward the apex of the cutter. The blades are forwardly pitched, as more clearly shown in Figure 3, and terminated in sharp cutting edges 21 extending from end to end of the blades.

As may be observed from an inspection of Figure 1 some of the blades extend further than others toward the apex of the cutter. Preferably alternate cutters will continue to the apex and the others will fall short of the apex as shown.

The head 1 is provided with channels as 22 leading from the chamber 3 one discharging in front of each leg 5 and directed toward the corresponding cutters so that the drilling fluid will be discharged successively into the upper ends of the flutes 19 as the cutters rotate. This drilling fluid is discharged under strong pressure and will efficiently wash out all clogging material that may collect in said flutes during drilling operations to the end that the cutters will be kept relatively free and clogging material will not collect and remain between the blades to impede the progress of the work.

The outer surface of the cutter blades should be coated with hard surfacing material suitable for the purpose.

The drawing and description disclose what is now considered to be a preferred form of the invention by way of illustration only, while the broad principle of the invention will be defined by the appended claims.

What I claim is:

1. In a drill an approximately conical shaped cutter having external blades spaced apart therearound and extending approximately from end to end of the cutter, said cutter having two bores therein, one being an axial internally threaded bore and the other being a shallow annular groove around said threaded bore and a wear ring in the groove.

2. In a drill head having downwardly extending legs and rotatable cutters on the legs; a mounting for each of the cutters comprising four parts, a spindle, a bushing insert, and a relatively thin washer, and means for preventing rotation of said washer with respect to the leg, each of said legs having a bearing therein, the bushing insert being positioned within the bearing and extended inwardly slightly beyond the inner surface of the leg, said washer being positioned around the extended end of the bushing, the rotation of the washer relative to the leg being prevented by said means, said spindle comprising a head, a bearing surface adjacent the head and means on the other end of the spindle for attaching the cutter to the spindle and preventing relative movement of the cutter with respect to the spindle, the spindle being positioned in the insert with the head on the outside of the leg and the cutter connected to the other end of the spindle by said attaching means.

3. In a drill having a head and a depending leg on the head provided with an inside bearing face which diverges from the axis of the head, said leg being also provided with a bearing which converges downwardly, with respect to the axis of the head; a bushing insert in the bearing whose inner end is extended beyond said bearing face, a relatively thin washer against said face and surrounding said extended end of the bushing, means for preventing the rotation of the washer relative to the leg, a spindle extended through the bushing, the outer end of the spindle having a head provided with an annular bearing surface which engages the outer side of the leg, an approximately conical shaped cutter whose large end bears against said leg face and has an annular countersunk recess to receive said washer and means on the other end of the spindle for attaching the cutter to the spindle and for preventing relative movement of the cutter with respect to the spindle.

WILLIAM L. PEARCE.